United States Patent
Rutschmann et al.

(10) Patent No.: US 7,353,698 B2
(45) Date of Patent: Apr. 8, 2008

(54) TEST STAND FOR SIMULATION OF THE EXHAUST FLOW OF AN INTERNAL COMBUSTION ENGINE

(75) Inventors: Erwin Rutschmann, Tiefenbronn (DE); Klaus Fuoss, Fond du Lac, WI (US); Marcel Hollmann, Saalfeld (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 178 days.

(21) Appl. No.: 10/536,190

(22) PCT Filed: Aug. 4, 2004

(86) PCT No.: PCT/EP2004/008705

§ 371 (c)(1),
(2), (4) Date: May 24, 2005

(87) PCT Pub. No.: WO2005/014983

PCT Pub. Date: Feb. 17, 2005

(65) Prior Publication Data

US 2006/0048565 A1 Mar. 9, 2006

(30) Foreign Application Priority Data

Aug. 12, 2003 (DE) ............... 103 36 970

(51) Int. Cl.
*G01M 19/00* (2006.01)
(52) U.S. Cl. ..................... 73/118.1; 73/116
(58) Field of Classification Search ...... 73/116–117.3, 73/118.1, 865.6
See application file for complete search history.

(56) References Cited

U.S. PATENT DOCUMENTS

| | | | |
|---|---|---|---|
| 4,996,875 A | | 3/1991 | Kopinski et al. |
| 5,786,531 A | * | 7/1998 | Lewis et al. ............ 73/116 |
| 5,808,188 A | | 9/1998 | Chriswell et al. |
| 6,053,133 A | * | 4/2000 | Faria et al. ......... 123/90.16 |

(Continued)

FOREIGN PATENT DOCUMENTS

DE 42 09 684 A1 9/1993

(Continued)

OTHER PUBLICATIONS

R. Boonen, P. Sas: "Design of an Active Exhaust Attenuating Valve for Internal Combustion Engines," Internationale Conference on Noice Vibration Engineering, 'Online! Seiten 33-42, XP002310873.

(Continued)

*Primary Examiner*—Edward Lefkowitz
*Assistant Examiner*—Jermaine Jenkins
(74) *Attorney, Agent, or Firm*—Crowell & Moring LLP

(57) ABSTRACT

This invention relates to a test stand for simulation of the exhaust flow of an internal combustion engine, comprising a cylinder (36) and a base body (39) which is designed as a cylinder head and in which at least one exhaust port (41, 42) which is monitored by a charge cycle valve (43, 44) is provided for simulation, and/or, mapping, of a combustion chamber and a trough and/or cup (40) is also provided, whereby the charge cycle valve (43, 44) can be operated with the help of a valve lift switching [device],
a control device for the valve lift shifting and
a device for filling the cylinder (36) with compressed air.

13 Claims, 9 Drawing Sheets

U.S. PATENT DOCUMENTS

| | | | |
|---|---|---|---|
| 6,164,255 A * | 12/2000 | Maas et al. | 123/90.16 |
| 6,196,175 B1 * | 3/2001 | Church | 123/90.16 |
| 6,202,415 B1 * | 3/2001 | Lohmann et al. | 60/612 |
| 6,213,076 B1 * | 4/2001 | Fischer et al. | 123/90.55 |
| 6,244,229 B1 * | 6/2001 | Nakano et al. | 123/90.15 |
| 6,401,527 B1 * | 6/2002 | Langer | 73/117.3 |
| 6,761,077 B1 * | 7/2004 | Zhu | 73/865.6 |
| 7,028,539 B2 * | 4/2006 | Erlach et al. | 73/116 |
| 7,174,713 B2 * | 2/2007 | Nitzke et al. | 60/605.2 |
| 7,174,777 B2 * | 2/2007 | Fischer et al. | 73/118.1 |
| 2001/0016044 A1 | 8/2001 | Lee | |
| 2004/0210428 A1 * | 10/2004 | Schoeggl | 703/8 |

FOREIGN PATENT DOCUMENTS

| | | |
|---|---|---|
| DE | 195 28 505 | 2/1997 |
| DE | 196 01 587 A | 7/1997 |
| JP | 11 311589 A | 11/1999 |
| JP | 2000 297616 A | 2/2001 |

OTHER PUBLICATIONS

*Zur Frage der schrägen Stoßwelle auf die Kante des Auspuffventils, MTZ (Motor Technische* Zeitschrift [Automotive Engineering Journal] 51, 1990, No. 7/8, pp. 336-343.

* cited by examiner

TEST STAND FOR SIMULATION OF THE EXHAUST FLOW OF AN INTERNAL COMBUSTION ENGINE

The present invention relates to a test stand for simulating the exhaust flow of an internal combustion engine.

BACKGROUND OF THE INVENTION

The power characteristic of a four-cycle engine is determined to a significant extent by the quality of the charge cycle. In a combustion engine, the exhaust valve practically always opens the cylinder at a supercritical pressure gradient, so the flow processes in the charge cycle channels are highly non-steady. When the exhaust valve is opened before reaching bottom dead center (BDC) of the piston, a pre-exhaust wave, i.e., an exhaust process with a supercritical pressure gradient, is generated. Since the exhaust port monitored by the exhaust valve of a combustion engine can be regarded as a poorly designed Laval nozzle, a flow discontinuity occurs due to the non-steady-state flow conditions. This always results in the development of a perpendicular compression wave. Due to the perpendicular compression wave, flow is immediately decelerated to subsonic speed so the exhaust mass flow drops greatly. In addition, due to the pre-exhaust wave, aerodynamic noises are generated, resulting in corresponding pressure fluctuations. To counteract the inadequacies described above, in particular in the pre-exhaust wave, numerous studies have been conducted with regard to improving the charge cycle load processes.

For example, a computational method and a program for the aerodynamic supersonic flow of the exhaust and for the shaping of the valve were developed as described in MTZ (*Motor Technische Zeitschrift* [Automotive Engineering Journal] 51, 1990, No. 7/8, pp. 336 to 343). The goal was to design the exhaust port and/or the valve geometry so that the calculated system will function without waves or pulsation. The possibility of completing the flow by reducing the exhaust velocities of the combustion gases was also taken into account.

SUMMARY OF THE INVENTION

To be able to better understand and investigate the non-steady-state flow processes described previously in the charge cycle processes, an object of this invention is to develop a test stand that will simulate the exhaust processes that actually occur on the basis of various channel models and will yield reproducible results in a process while still being equipped for easy design implementation with standard components.

This object has been achieved by providing a test stand having a cylinder and a base body configured as a cylinder head and in which at least one exhaust port which is operatively associated with a charge cycle valve is provided for at least one of simulation, and mapping of a combustion chamber, and at least one of a trough and cup is also provided, whereby the charge cycle valve is operatable with the aid of a valve lift switching, a device for controlling the valve lift switching, and a device for filling the cylinder with compressed gas.

With the test stand of the present invention, exhaust flow processes are easily simulated, and their results can be used in the implementation of channel geometries and/or valve and valve seat geometries.

To be able to investigate various exhaust port forms and geometric shapes of exhaust valves and valve seat rings, the cylinder head has a replaceable base body in which the exhaust port and a trough and/or cup are integrated to map the combustion chamber.

A housing is adjacently mounted on the base body of the cylinder head with switchable bucket tappets accommodated in the housing so that they can be cooperate with a camshaft mounted on the housing. The switchable drive guide is designed so that an internal lifting piston of the bucket tappet cooperates with a diameter of a circle of the camshaft for implementation of a zero stroke, while an external lifting piston of the bucket tappet cooperates with a cam of the camshaft for implementation of a valve lift. With this switchable valve drive, the desired exhaust processes at the preselected and/or desired operating points can be simulated.

The internal and external lifting pistons of the bucket tappets can be switched and locked in relation to one another via a hydraulically operable locking unit. A motor-driven oil pump is provided for the oil pressure supply of the hydraulic system. The hydraulic system for supplying the oil pressure for the hydraulic valve clearance adjustment and for the valve lift switching has an oil tank, an oil filter and a shift valve in addition to the oil pump with the motor and a pressure-limiting valve. For the drive of the camshaft, the test stand is provided with an electric motor which drives the camshaft via a belt drive. To be able to simulate the rotational speeds required for today's high performance engines, the electric motor is driven by a frequency converter which helps to regulate the rotational speed of the three-phase motor in the range of 250 to 8000 rpm.

To be able to investigate different geometries of the exhaust port, the exhaust valve and the valve seat ring acoustically and in terms of gas dynamics on the flow test stand, multiple sensors and microphones are provided. One or more pressure and temperature sensors are provided in both the cylinder and the exhaust port, whereas microphones for measuring the sound pressure are provided at several locations in the exhaust port.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
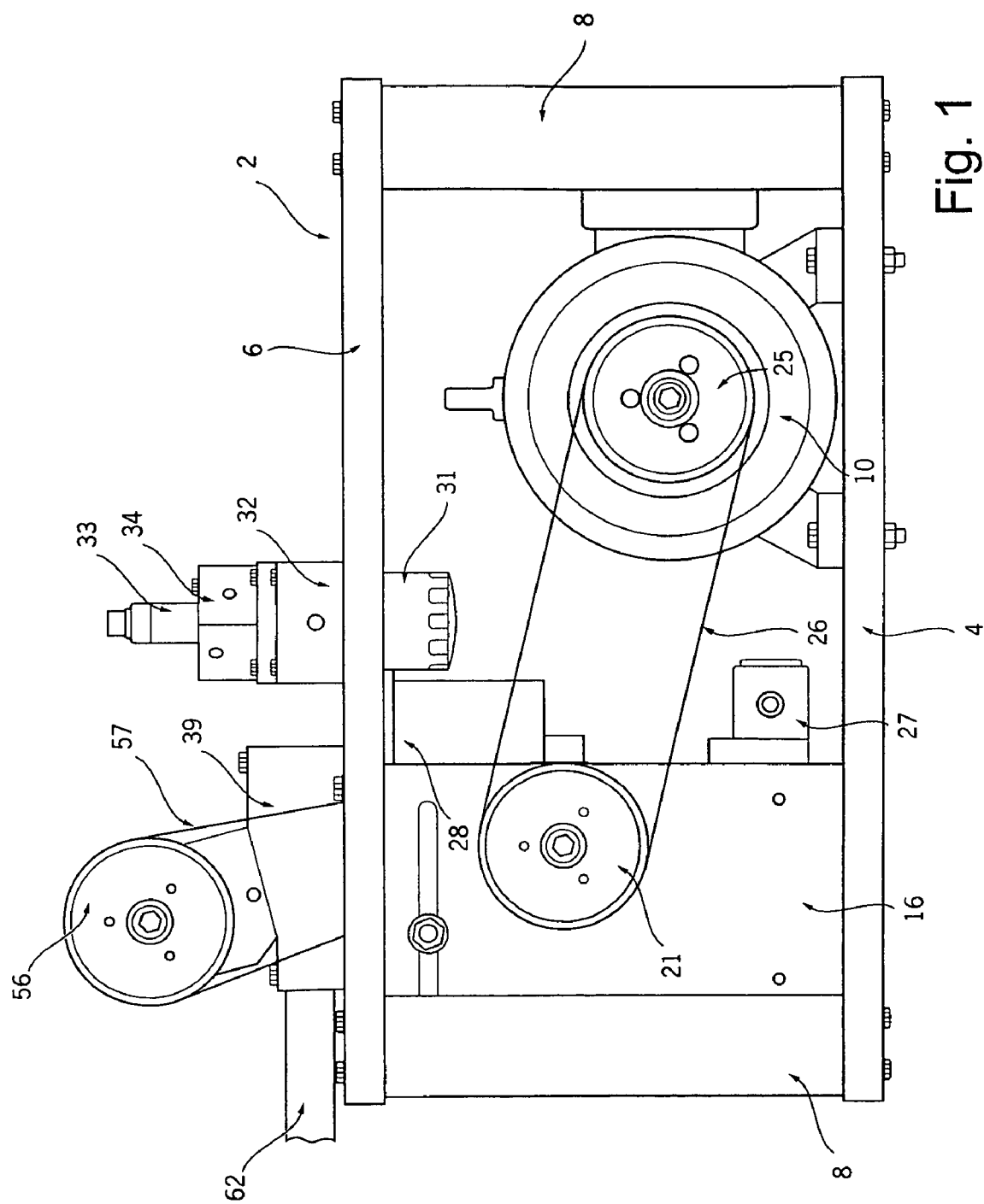
FIG. 1 is a side view showing the essential components of a test stand according to the present invention, FIG. 2. is a plain view of the lower base plate of the test stand of FIG. 1, FIG. 3. is a plain view of an upper base plate of the test stand of FIG. 1.

The test stand depicted in FIG. 1 includes a rectangular housing 2 which has lower and upper base plates 4, 6, the two plates being held a distance apart by four corner sections 8. An electric motor 10 mounted on the lower base plate 4 is provided for driving a camshaft 12 (to be described in greater detail below). The electric motor 10 is driven with the aid of a frequency converter which is accommodated, e.g., in a switchbox (not shown) mounted on the upper base plate 6. In addition, an intermediate plate 16 is also mounted on the lower base plate 4 by way of two mounting angles 14, 15. The intermediate plate extends to the upper base plate 6 where it is attached.

Figure 4:
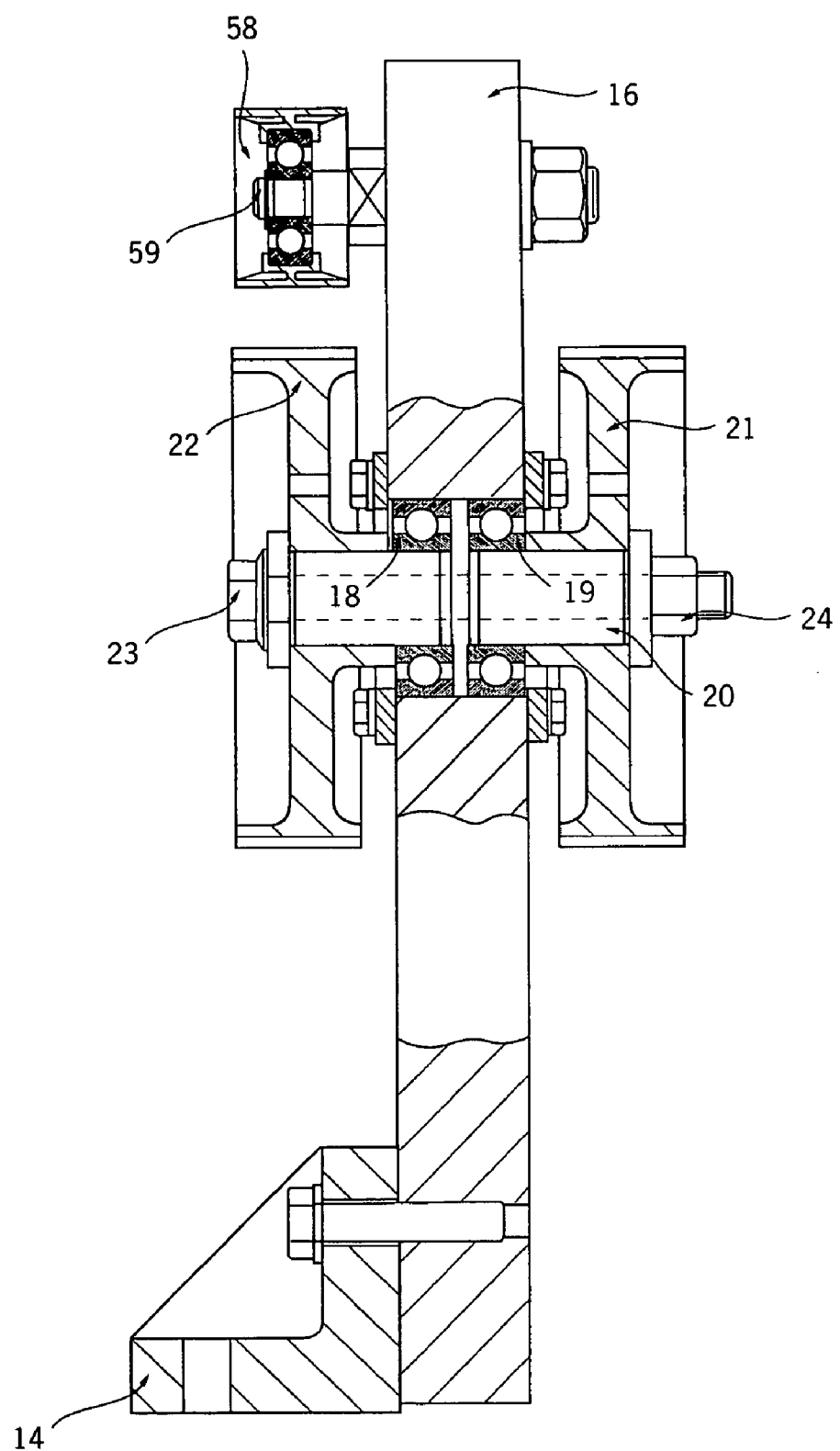
FIG. 4 is a partial cross-sectional view of an intermediate plate of the test stand with two pulleys.

As shown in FIG. 4, an opening is provided in the intermediate plate 16, with a camshaft 20 rotatably mounted in the opening by way of two deep groove ball bearings 18, 19. On each side of the intermediate plate 16, a pulley 21, 22 is placed on the intermediate shaft 20 and secured axially by a hexagon head screw 23 and a hexagon nut 24. A pulley 25 is also mounted on the drive shaft of the electric motor 10, with a primary drive toothed belt 26 being situated between the pulley 25 of the electric motor 10 and the pulley 21 of the intermediate shaft 20. In addition, an oil pump 27 (FIG. 2) which is driven by a motor is mounted on the lower base plate 4 and is provided for supplying oil pressure to the switchable valve drive to be described in greater detail below.

Figure 3:
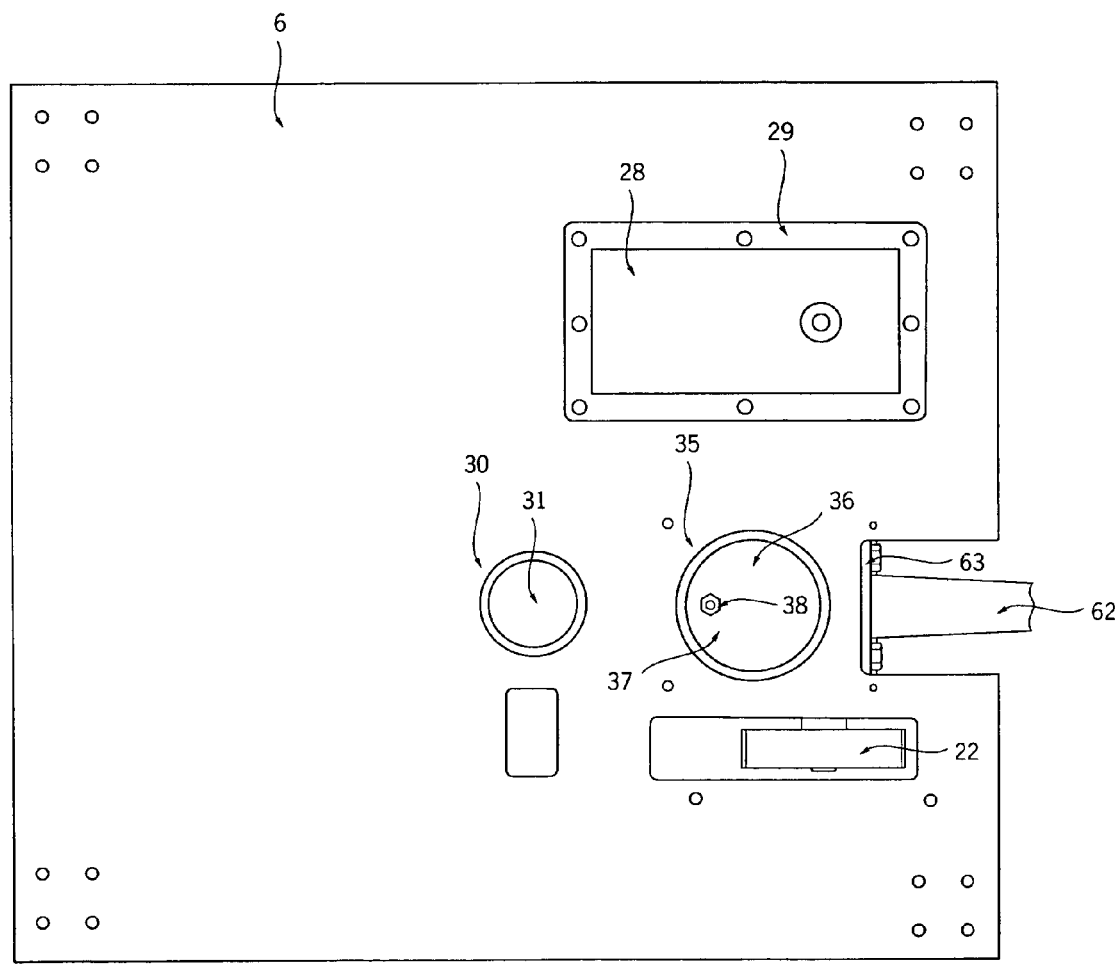

As shown in FIG. 3, an oil tank 28 having a rectangular flange face 29 that is sealed with respect to the base plate 6 is mounted and sealed on the upper base plate 6. The upper base plate 6 also has a first circular opening 30 through which is inserted an oil filter 31 that is integrated into the oil circulation (to be described in greater detail below). The oil filter 31 is mounted on an oil filter block 32 (FIG. 1) which is combined as one modular unit with a shift valve block 34 accommodating a shift valve 33. A second circular opening 35 is provided in the upper base plate 6 through which a cylinder 36 passes. A valve 38 is provided in the bottom end face 37 of the cylinder 36 and serves to fill the cylinder 36 with compressed air. The cylinder 36 which is in the form of a pot is open at the top and is sealed with respect to a base body 39.

Figure 5:
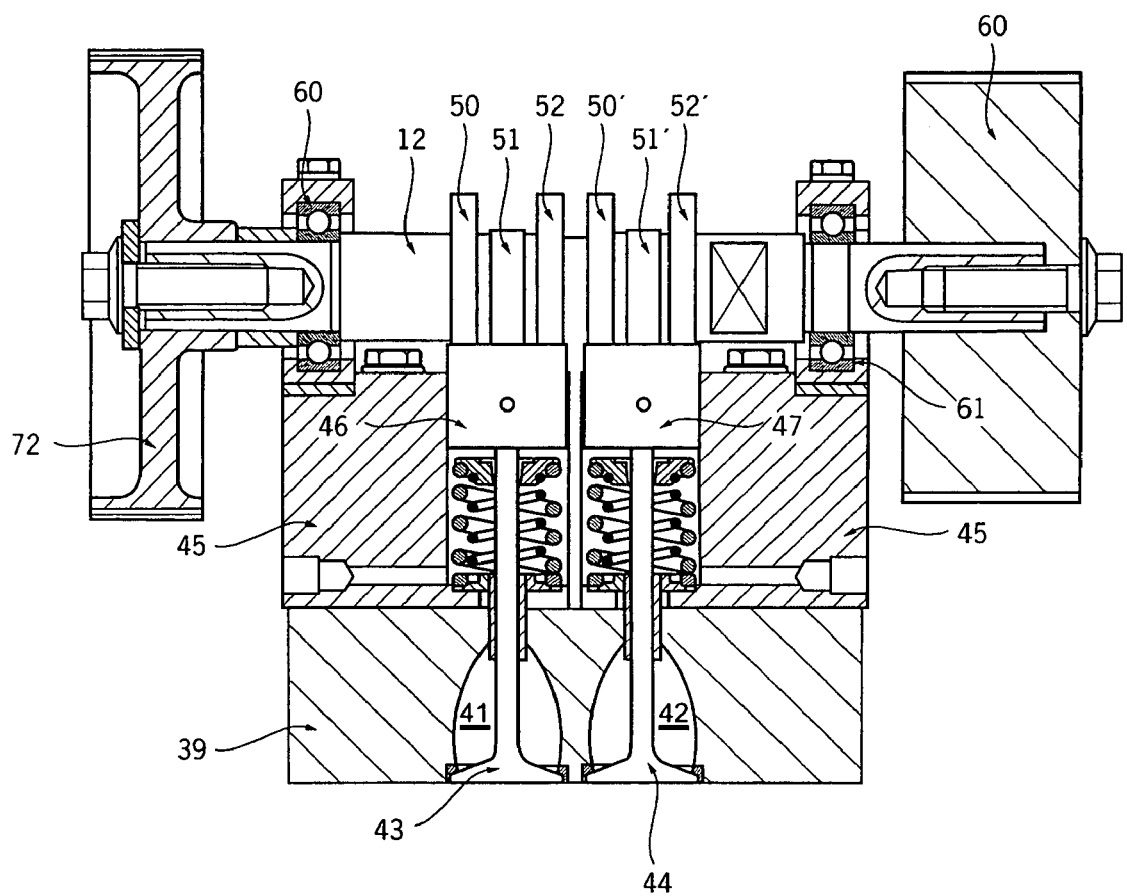
FIG. 5 is a partial longitudinal cross-section view through the cylinder head of the flow test stand.
Figure 6:
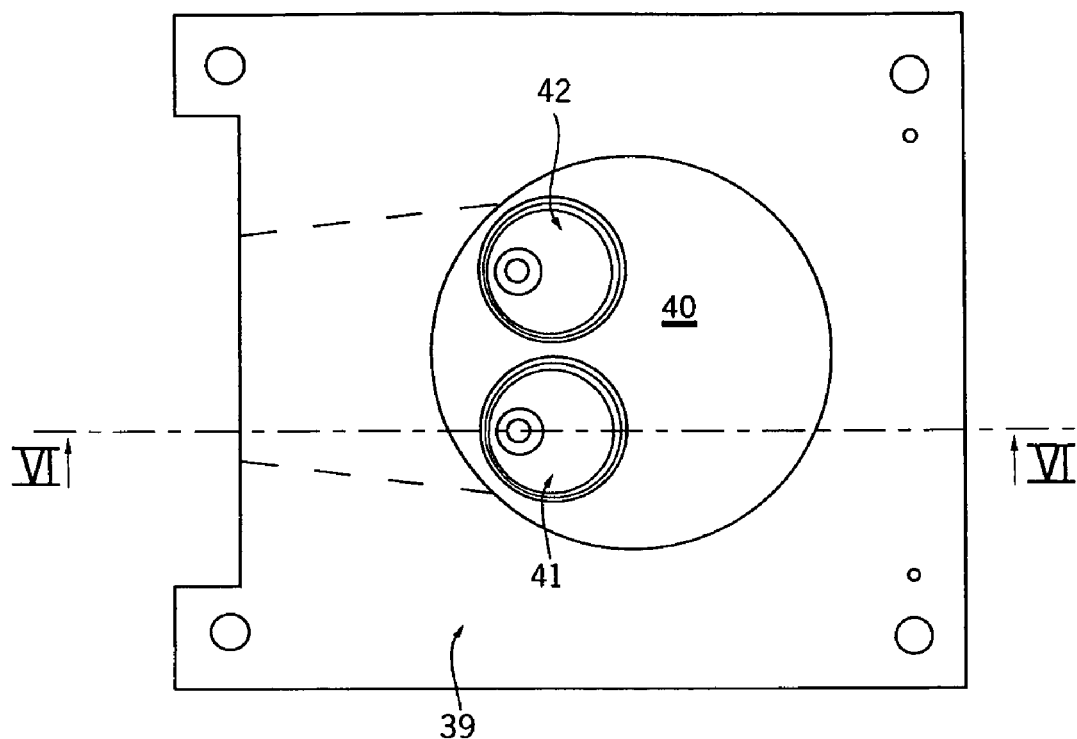
FIG. 6 is a plain view of a base body of the cylinder head from beneath.
Figure 7:
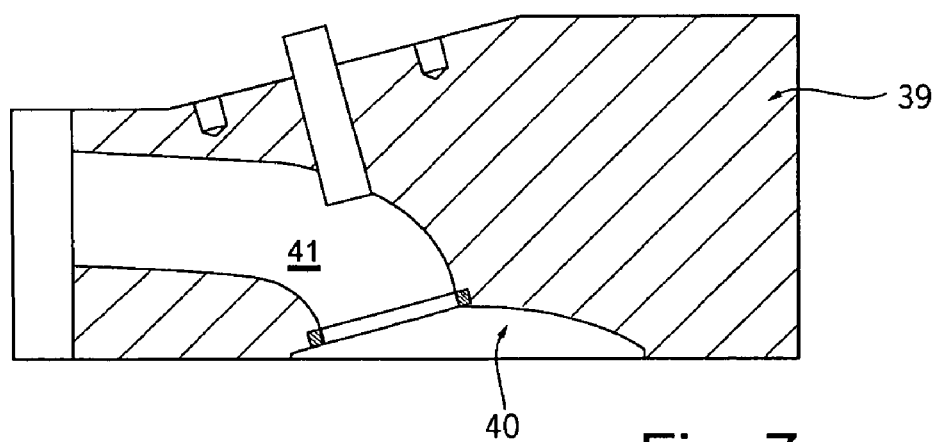
FIG. 7 is a sectional view along line VI-VI in FIG. 6.

As shown in FIGS. 6 and 7, a cup 40 for mapping, i.e., simulating a combustion chambers is provided in the base body 39 along with exhaust ports 41, 42 that communicate with the cup 40. The two exhaust ports 41, 42 are controlled and/or monitored by two exhaust valves 43, (FIGS. 8 and 9) 44. A bucket tappet housing 45 (FIG. 5) is connected to the base body 39 and has two bucket tappets 46, 47 acting as cam follower elements guided therein.

Figure 9:
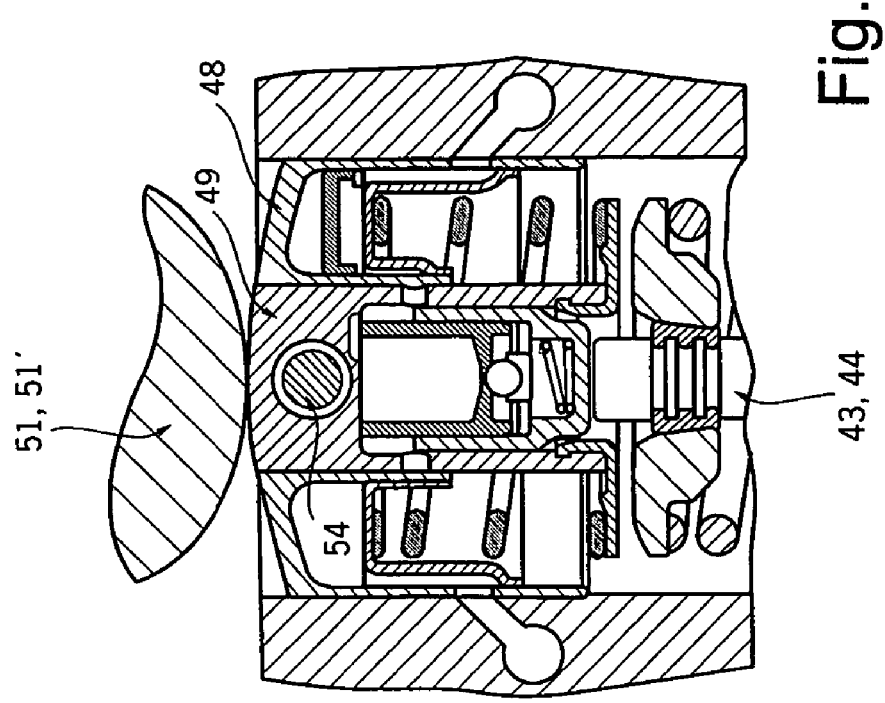
FIG. 9 is a partial longitudinal sectional view through a lift transmission element.
Figure 8:
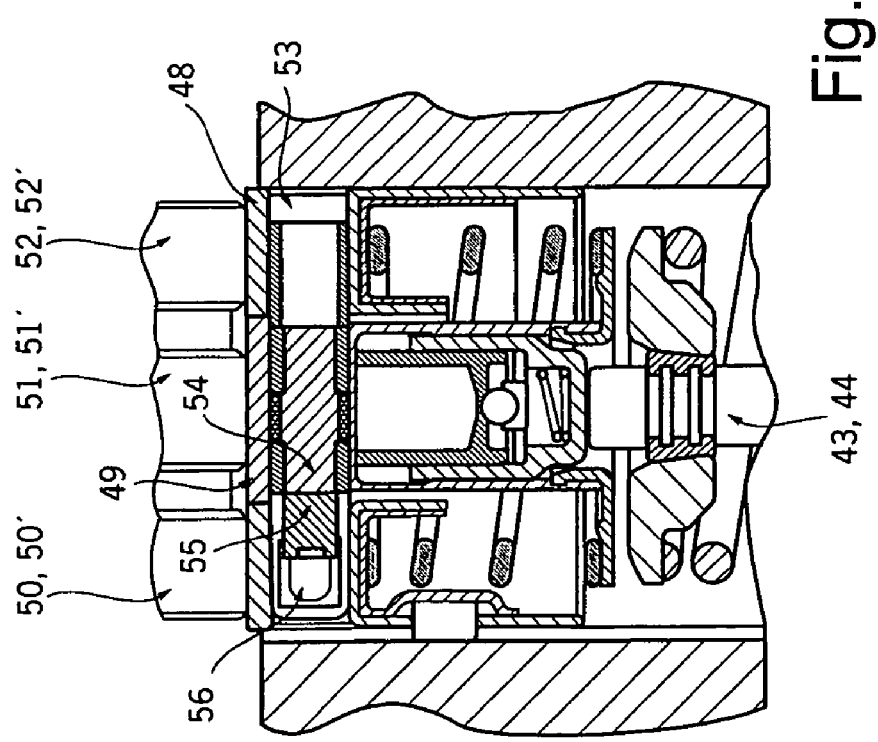
FIG. 8 is an isolated cross sectional view through a lift transmission element.

As shown in FIGS. 8 and 9, the bucket tappets 46, 47 have two concentrically arranged cup elements, referred to below as the external lifting piston 48 and the internal lifting piston 49, each cooperating with different cams (partial cams) 50 to 52 and/or 50' to 52'. The cams 50, 52 and 50', 52' are all identical in design, i.e., they have the same height of lift and phasing and they cooperate with the external lifting piston 48. The camshaft area 51 and/or 51' formed between the two cams 50, 52 and 50', 52' is provided with a circular diameter, however, so that regardless of the rotational position of the cam shaft 12 in cooperation with the internal lifting piston 49, a zero lift is created in which the exhaust valves 43, 44 are not opened.

The two lifting pistons 48, 49 have a bore 53 (FIG. 8) in their bottom area. The lifting pistons are aligned with one another in the basic circular phase of the partial cams 50 to 52 and/or 50' to 52' so that the external lifting piston 48 with the internal lifting piston 49 can be locked in this position by piston elements 54, 55 that are displaceable longitudinally in the bore 53. The displacement of the piston elements 54, 55 and thus the locking are accomplished hydraulically. To this end, an end face of the piston element 55 is acted upon with hydraulic oil through an opening 56. The locking mechanism is not described further here as it is described, for example, in greater detail in DE 196 01 587 A1 or DE 195 28 505 A1.

If the external and internal lifting pistons 48, 49 are locked with respect to one another via the piston elements 54, 55 in a first working position, i.e., switch position, then a corresponding valve lift is transmitted to the exhaust valves 43, 44 via the external cam areas 50, 52 and/or 50', 52'. The pressure exerted on the piston 55 is interrupted and/or reduced by the operation, i.e., switching of a control valve situated in a hydraulic supply line (to be explained in greater detail below) to the extent that the spring-loaded piston 54, 55 is returned from its locked operating position so that both lifting pistons 48, 49 are again arranged to be freely movable with respect to one another. As already explained, no lift is transmitted to the exhaust valves 43, 44 in this operating state because of the partial cam 51 and/or 51' designed as a diameter of a circle.

Figure 2:
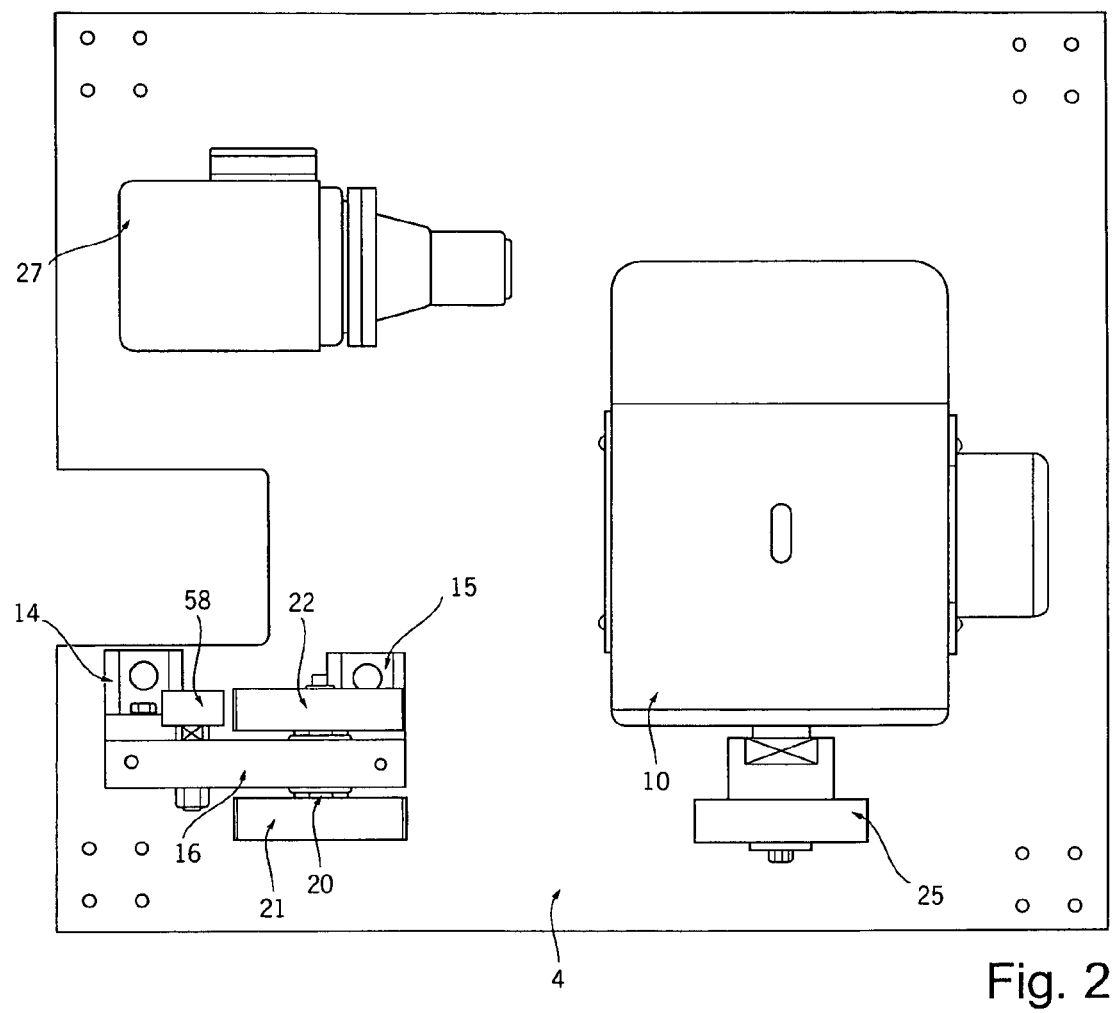

On the left end face of the camshaft 12 as viewed in FIG. 2, a pulley 72 is mounted and is connected to the pulley 22 of the intermediate shaft 20 via a secondary driving toothed belt 57. A tension roller 58 is provided on the intermediate plate 16 and mounted on a shaft 59, which is in turn rotatably mounted on the intermediate plate 16, to ensure a proper belt tension (FIG. 4). In addition, a flywheel element 60 is mounted on the right end face of the camshaft 12 (FIG. 5). The camshaft 12 is rotatably mounted on the bucket tappet housing 45 with the help of two deep groove ball bearings 60, 61.

Figure 10:
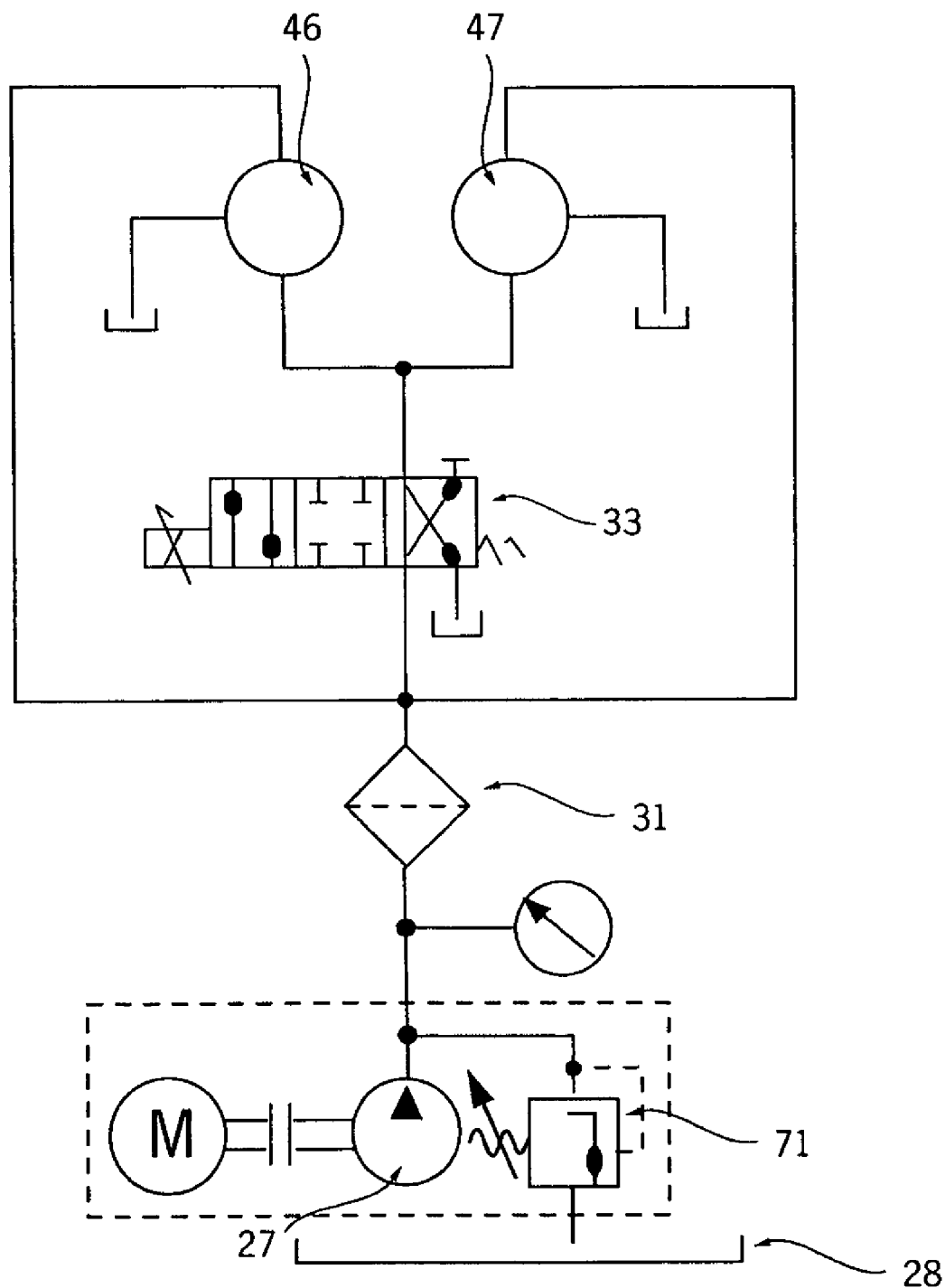
FIG. 10 is a hydraulic schematic diagram for the switchable drive.

The hydraulic switching circuit provided for the variable valve drive is described below on the basis of FIG. 10. To facilitate a better overview, the depiction of hydraulic connections, lines, etc. between the individual components situated in the hydraulic circuit has been omitted in the other figures. The connection of the individual hydraulic components is implemented with the help of conventional steel flex lines. These steel flex lines are attached to the components with double connections and fittings in a known way. With the help of the oil pump 27, hydraulic oil is conveyed out of the oil tank 28 and to the bucket tappets 46, 47. The oil pump has a spring-loaded pressure-limiting valve 71 with which the system pressure can be adjusted directly on the oil pump 27.

The valve lift switching of the switchable bucket tappets 46, 47 is controlled with the shift valve 33 configured as a 4/3-way valve in the hydraulic feeder line. In the left switch position of the shift valve 33, the lock is activated via the bore 53 provided in the bucket tappets 46, 47 so that the valve lift which is defined by the partial cams 50, 52 and/or 50', 52' is activated. When the electrically triggerable shift valve 33 is moved into its right switching position, the pressure line leading to the bucket tappets 46, 47 is blocked. The pressure-limiting valve 71 opens and the hydraulic oil is returned to the oil tank 28 in the short circulation loop. The hydraulic oil pressure in the bore 53 drops and the two spring-loaded piston elements 54, 55 are moved into a position in which the external and internal lifting pistons 48, 49 are again freely movable toward one another. In this position, as explained above, a zero lift is generated whereby the exhaust valves 43, 44 do not open. Two lines and/or bores (not shown) for the oil supply of the known hydraulic valve clearance adjustment lead out of the oil filter block 32 directly to the bucket tappet guides.

Figure 11:
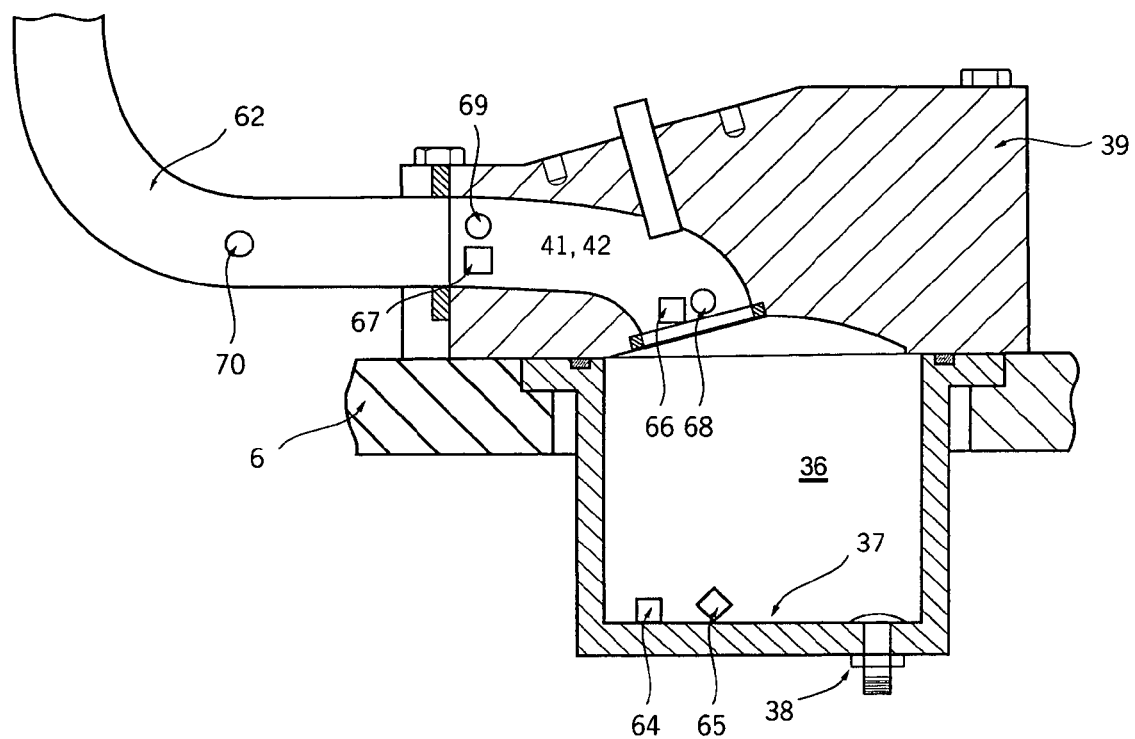
FIG. 11 is a schematic view of the cylinder and cylinder head with the provided measurement sites.

An exhaust pipe 62 connected to the two exhaust ports 41, 42 is mounted on the base body 39 with the help of a flange 63 (FIGS. 3 and 11). A pressure sensor 64 and a temperature sensor 65 are arranged in the interior of the cylinder 36. Second and third pressure sensors 66, 67 are provided in the exhaust ports 41, 42 (two pressure sensors 66) each in immediate proximity to the valve seat rings, and one pressure sensor 67 is provided at the end of the exhaust ports 41, 42 which are combined in the base body 39. Two first microphones 68 are also situated in immediate proximity to the valve seat rings and a second microphone 69 is also situated at the end of the exhaust ports 41 42 which are combined in the base body 39. A third microphone is mounted in the exhaust pipe 62.

To simulate the pre-exhaust wave, the cylinder 36 is filled with compressed air through the valve 38 via an external compressed air supply. The camshaft 12 is driven by the primary and secondary toothed belts 26, 57 via the electric motor 10 which is driven with the aid of the frequency converter. frequency converter allows the electric motor 10 to be operated in the range of 250 to 8000 rpm. With the valve lift switching described above, it is now possible to switch from the zero lift (average camshaft range 51 and/or 51') to a valve lift (partial cams 50, 52 and/or 50', 52'), which produces a sudden opening of the two exhaust valves 43, 44 at the desired measurement points in time and/or when selected operating points prevail.

With the opening of the exhaust valves 43, 44, the pressure characteristics over the valve lift are measured by the pressure sensors 64, 66 and 67, with the static pressures being recorded. The characteristic of the cylinder pressure and the residual pressure in the cylinder 36 at the end of the measurement (piston at bottom dead center) are critical criteria for evaluating the quality of the entire pre-exhaust flow. To be able to make more accurate estimates specifically regarding the pre-exhaust wave, it is necessary to measure the pressure gradient between the beginning of the channel and cylinder 36. For this reason, the pressure sensor 66 is situated directly at the beginning of the channels 41, 42. The pressure allows an estimate of the development of compression waves with respect to the valve lift in the area of the exhaust valves 43, 44 and/or the valve seat rings. The pressure characteristics between the start of the channel and the end of the channel can be used to determine the loss of static pressure in the exhaust ports 41, 42. It is thus possible to estimate the flow losses in the exhaust ports 41, 42 because these are reflected in the static pressure.

With the aid of the three microphones 68, 69, 70, the sound pressure is measured. The sound pressure level can be determined from this information. For a more detailed analysis, the total noise is divided into so-called frequency bands (octave bands and third-octave bands). The influence of the respective frequency range on the total sound level can thus be determined. The microphone 68 measures the sound pressure directly at the start of the channel, which represents the area of greatest interest for the acoustic analysis. The microphone 68 is in the mixed zone of turbulent-free streaming which develops directly behind the exhaust valves 43, 44. In the mixing processes, free eddies develop and a great deal of turbulent stresses which causes the corresponding pressure fluctuations. For the reproducibility of the measurements, the temperature sensor 65 is provided in the cylinder 36 because otherwise the temperature differences that occur in the starting state would influence the measurements.

On the basis of the easy interchangeability of the base body 39 attached to the upper base plate 6, all conventional exhaust port designs (including steep experimental port designs) can be analyzed inexpensively. Thus, this makes available a test stand and method for simulation of the exhaust flow of an internal combustion engine with which turbulent flow that occurs in practice with the opening of the exhaust valves before bottom dead center can be investigated easily.

The invention claimed is:

1. Test stand for simulation of an internal combustion engine exhaust flow, comprising
   only a portion of an internal combustion engine consisting of a cylinder and a base body configured as a cylinder head and in which at least one exhaust port which is operatively associated with a charge cycle valve is provided for at least one of simulation and mapping of a combustion chamber, and at least one of a trough and cup is also provided, whereby the charge cycle valve is operateable with the aid of a valve lift switching;
   a device for controlling the valve lift switching, and
   a device for filling the cylinder with externally-supplied compressed gas.

2. Test stand as claimed in claim 1, wherein, the internal and external lifting pistons of the bucket tappet are arranged to be at least one of switched and locked in relation to one another via a hydraulically operable locking unit.

3. Test stand as claimed in claim 2, wherein the bucket tappets include internal and external lifting pistons cooperate with a cam arrangement to implement a valve lift and a zero lift, with the internal lifting piston cooperating with a camshaft area of the camshaft having a circular diameter.

4. Test stand as claimed in claim 2, wherein oil pump is driven by a motor for oil pressure supply of a hydraulic system.

5. Test stand as claimed in claim 4, wherein the hydraulic system comprises a shift valve, an oil tank and an oil filter.

6. Test stand as claimed in claim 1, wherein sensors for detecting physical parameters of state are operatively arranged in the cylinder and in the at least one exhaust port.

7. Test stand as claimed in claim 6, wherein at least one pressure sensor and at least one temperature sensor are provided in the cylinder and in the at least one exhaust port.

8. Test stand as claimed in claim 6, wherein microphones for measuring the sound pressure are distributed at selected locations in the at least one exhaust port.

9. Test stand for simulation of an internal combustion engine exhaust flow, comprising
   a cylinder and a base body configured as a cylinder head and in which at least one exhaust port which is operatively associated with a charge cycle valve is provided for at least one of simulation and mapping of a combustion chamber, and at least one of a trough and cup is also provided, whereby the charge cycle valve is operateable with the aid of a valve lift switching;
   a device for controlling the valve lift switching, and
   a device for filling the cylinder with externally-supplied compressed gas, wherein a housing is mounted on the base body, and switchable bucket tappets are accommodated in the housing so as to be operable by a camshaft mounted on the housing.

10. Test stand as claimed in claim 9, wherein the bucket tappets include internal and external lifting pistons cooperate with a cam arrangement to implement a valve lift and a zero lift, with the internal lifting piston cooperating with a camshaft area of the camshaft having a circular diameter.

11. Test stand as claimed in claim 9, wherein the camshaft is driven by an electric motor via a belt drive.

12. Test stand as claimed in claim 11, wherein a frequency converter operatively arranged for driving the electric motor.

13. Method for simulation of an internal combustion engine exhaust flow comprising:

using a test stand apparatus having only a portion of an internal combustion engine consisting of a cylinder and a cylinder head to at least one of simulate and map a combustion chamber of varying configurations, employing valve lift switching for a change cycle valve arrangement, filling the simulated combustion chamber with pressurized gas, and sensing pressure characteristics at preselected locations on the apparatus.

* * * * *